June 22, 1948.  D. LAZARUS  2,443,684
PALLET
Filed March 26, 1946
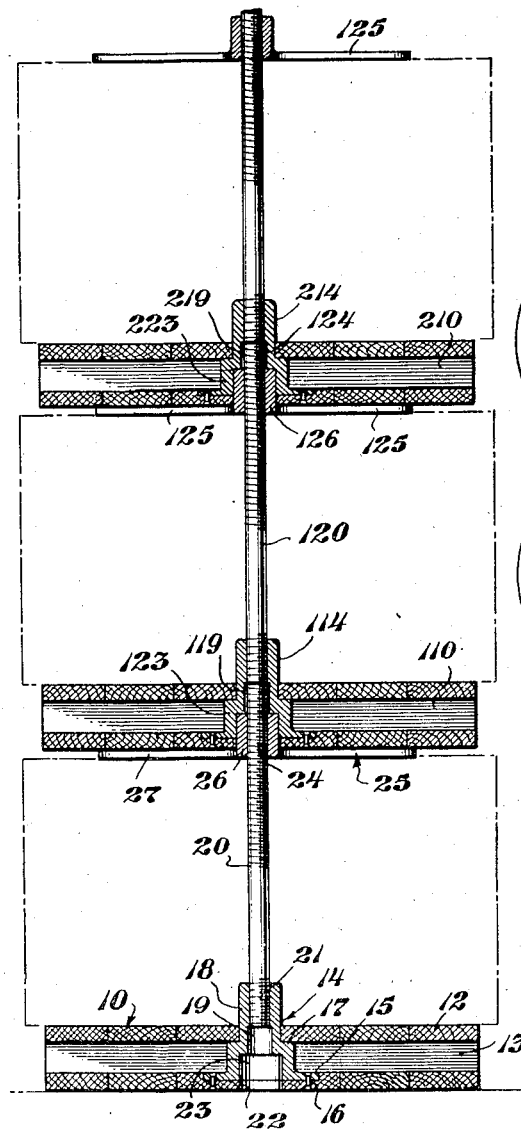
Fig.1.
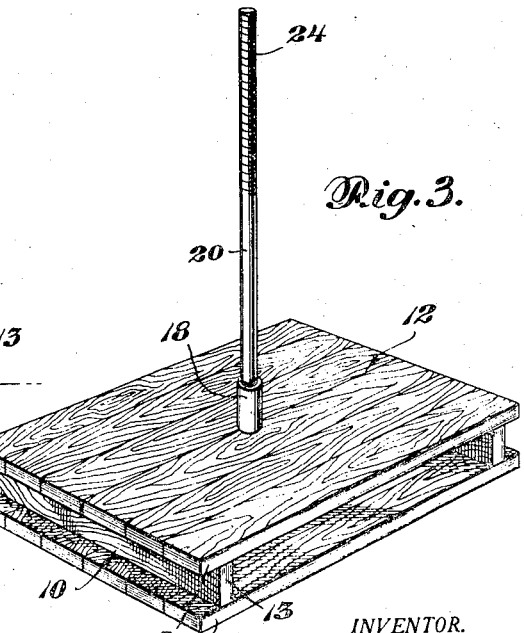
Fig.2.
Fig.3.
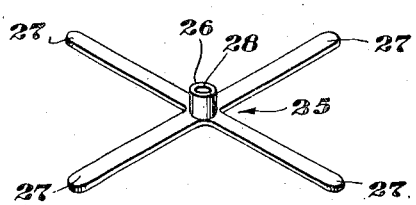
Fig.4.
INVENTOR.
David Lazarus.
BY KARL W. FLOCKS
ATTORNEY Patented June 22, 1948

2,443,684

UNITED STATES PATENT OFFICE 2,443,684

PALLET

David Lazarus, Baltimore, Md.

Application March 26, 1946, Serial No. 657,262

5 Claims. (Cl. 211—74)

1

This invention relates to pallets and more particularly to pallet structure of a character where not only the load on a single pallet is positively secured to the pallet but loaded pallets may be arranged vertically one above the other in a stable manner.

Prior to the instant invention it has been customary to load pallets with freight, merchandise or the like and move the loaded pallet to a specific location in a warehouse or storeroom. When the floor of the warehouse or storeroom is crowded and additional space is needed, loaded pallets may be stored above other loaded pallets resting on the floor. The location of the second loaded pallet above the first loaded pallet effects the stability of the stored mass and if the merchandise or goods so stored is of such a character as to be relatively unstable, it is not generally feasible to make it a storeroom or warehouse practice of arranging loaded pallets one above the other.

It is an object of the instant invention to provide a pallet structure of such character whereby not only is the load positively tied to the pallet but loaded pallets may be stored one above the other in such a manner as to have relatively good stability.

It is another object of the instant invention to provide a novel pallet structure which will be inexpensive to produce, capable of facile use and imparting stability to the mass of goods loaded on the pallet.

Other objects and the nature and advantages of the instant invention will be apparent from the following description taken in conjunction with the accompanying drawings, wherein:

Figure 1 is a vertical sectional view with parts in elevation of a stack of loaded pallets resting on the floor of a storeroom or warehouse;

Fig. 2 is a top view of a loaded pallet in accordance with the invention;

Fig. 3 is a view in prospective of a pallet in accordance with the invention with an element thereof removed;

Fig. 4 is a view in perspective of an element of the pallet structure in accordance with the invention.

Referring to the drawings, the pallet structure comprises a base 10 including a lower platform element 11 and an upper platform element 12 secured together by the spacing rails 13. The platform elements 11 and 12 and the spacing rails 13 may be made of wood in the conventional manner so that the conventional pallet moving rig may be used which comprises a fork or similar

2 element adapted to be inserted in the space between the elements 11 and 12 so that the pallet may be lifted and moved from one place to another. In the central portion of the pallet is the metal socket 14 which may be a casting or forging or may be machined out of a solid block of metal. The socket 14 is of generally tubular structure flanged at the bottom as at 15 which flange is secured to the element 11 by the rivets 16 or in any other suitable manner. The socket 14 also includes on its exterior a shoulder 17 which serves to brace the upper pallet element 12. Protruding through the upper element 12 at its center is the cylindrical projection 18 which is formed with a bore 19 having its upper portion threaded, which threaded portion is adapted to cooperate with the central post 20. The lower portion 21 of the central post 20 is threaded so as to cooperate with the threaded bore 19 of the socket 14. The bottom pallet element 11 is bored at its center as at 22 which bore 22 cooperates with a relatively large bore 23 in the lower end of the socket 14. The upper end of the central post 20 is also threaded as at 24 so as to cooperate with the nut-like locking mechanism 25 which may comprise a central hub 26 and four extending arms or spokes 27. The inner bore 28 of the hub 26 is threaded to cooperate with the threaded portion 24 of the central post 20.

In operation, the pallet shown in Figure 3 is loaded with merchandise or goods being arranged about the central post 20 and on the platform element 12. Then the nut-like element 25 is screwed onto the upper portion of the post 20 by a quick flick of one of the arms or spokes 27 until it is screwed down firmly to lock the merchandise or goods securely as shown in Figure 2. The loaded platform is moved to its place on the floor of the warehouse.

A second pallet 110 is similarly loaded and may then be arranged over the first pallet in such a manner that it is securely telescoped on the top end of the first pallet with the socket 114 having its bore 123 fitting snugly over the hub 26 of the locking element 25 of the first pallet and the upper end 24 of the first pallet fitting snugly within the bore 119 of the socket 114. Thus, the second pallet is securely "socketed" onto the first pallet in such a manner that the two pallets represent a relatively stable mass of merchandise or goods.

A third pallet 210 may then be arranged over the second pallet 110 with the socket 214 having its lower bore 223 fitting snugly over the hub 26 of the locking element 125 of the second pallet 110 and the bore 219 fitting snugly over the upper end 124 of the central post 120 and in this manner three pallets are located one above the other fully loaded and stable.

It will be obvious to those skilled in the art that various changes may be made without departing from the spirit of the invention and therefore the invention is not limited to what is shown in the drawings and described in the specification but only as indicated in the appended claims.

I claim:

1. A pallet comprising a base and securing means, said securing means including a lower portion secured to said base, a vertical post portion and a locking means adapted to engage said post and merchandise located on said base to secure said merchandise to said base, said lower portion being formed with a depression adapted to cooperate with the top of a post of a similar pallet structure in telescopic manner.

2. The structure recited in claim 1, said lower portion of said securing means comprising a socket structure secured to said base, said vertical post comprising a cylindrical rod, said locking means comprising a multi-spoked nut secured to the top of said post in threaded relation.

3. The structure recited in claim 1, the lower portion of said securing means comprising a socket of generally tubular structure having a flange portion at its lower end secured adjacent the bottom of said base and formed with a bore in its lower end adapted to cooperate with a projection on the locking means of a similar pallet located therebelow.

4. The structure recited in claim 1, said locking means comprising a nut-like structure including a hub and spokes or arms extending radially therefrom.

5. A stack of pallets each comprising a generally horizontal base and a single centrally located generally vertical upstanding post secured thereto, each of the bases having a socket in the bottom thereof telescopically fitted over the top of the post of the pallet immediately therebeneath, locking means engaging each post of each pallet and adapted to engage merchandise located on each base to secure the merchandise on each base.

DAVID LAZARUS.

REFERENCES CITED

The following references are of record in the file of this patent:

UNITED STATES PATENTS

| Number | Name | Date |
| --- | --- | --- |
| 1,490,665 | Gifford | Apr. 15, 1924 |
| 1,618,257 | Young | Feb. 22, 1927 |
| 2,297,347 | Cruickshank | Sept. 29, 1942 |

FOREIGN PATENTS

| Number | Country | Date |
| --- | --- | --- |
| 22,051 | Great Britain | Nov. 17, 1893 |